Jan. 27, 1970  L. E. MYLTING  3,491,922
INFLATABLE DIAPHRAGM VALVE
Filed Feb. 23, 1968  4 Sheets-Sheet 1

INVENTOR.
LAURITZ E. MYLTING
BY
Brumbaugh, Free, Graves & Donohue
his ATTORNEYS

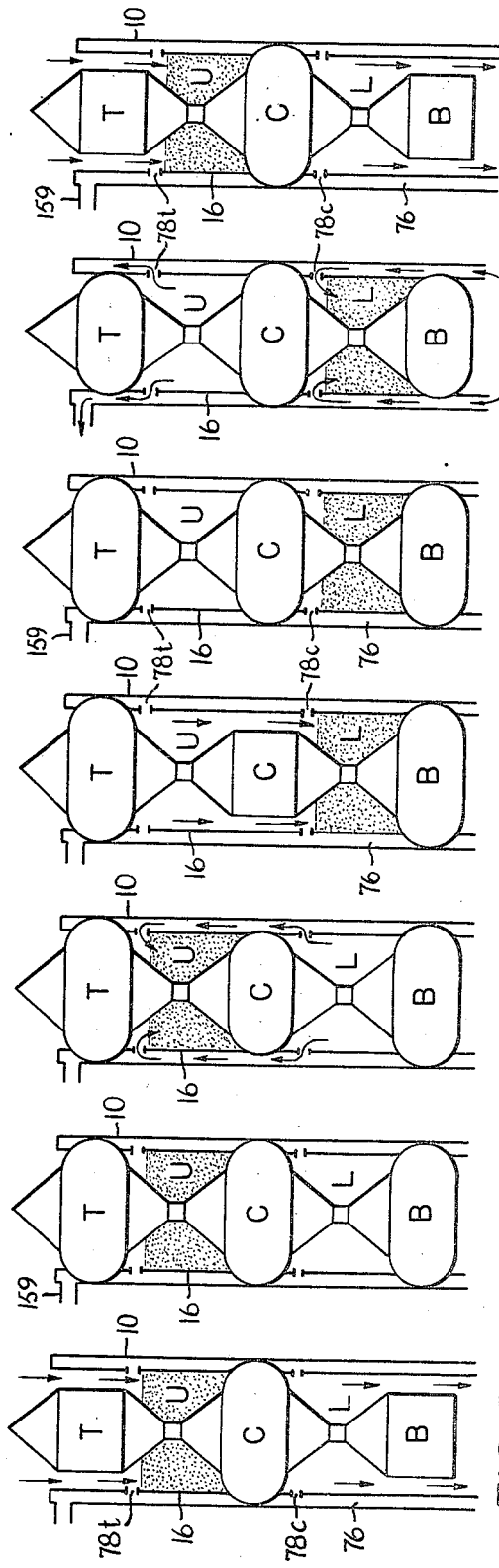
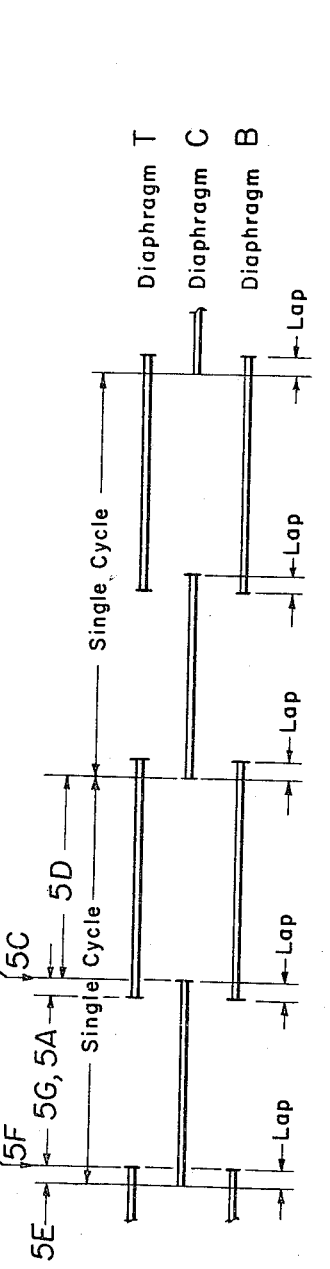

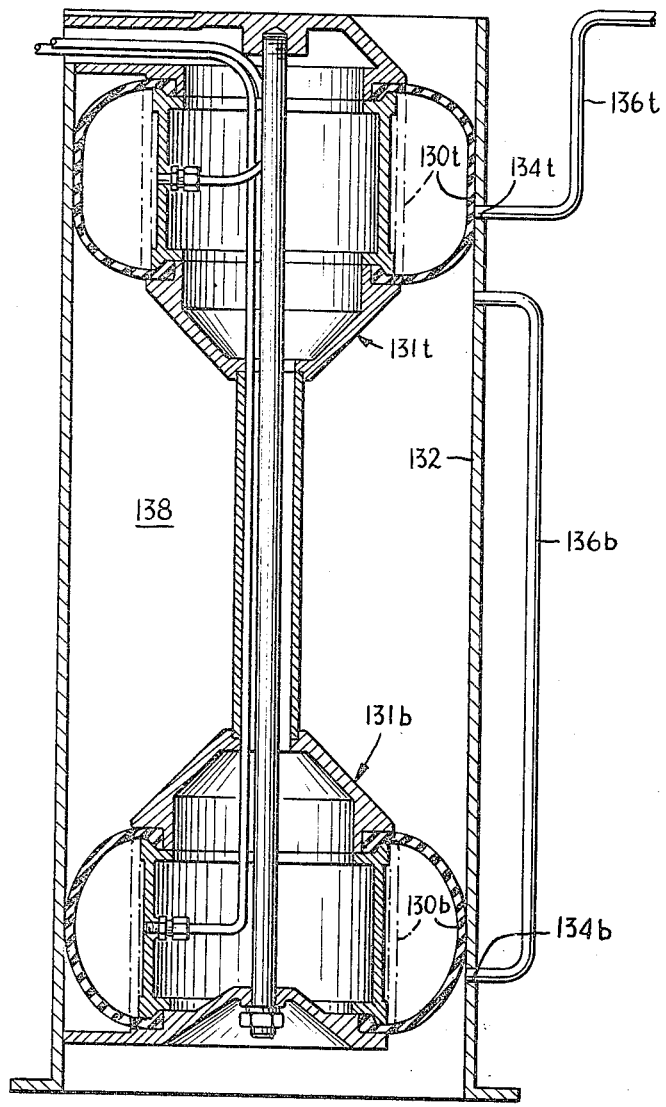

United States Patent Office 3,491,922
Patented Jan. 27, 1970

3,491,922
INFLATABLE DIAPHRAGM VALVE
Lauritz E. Mylting, Ardmore, Pa., assignor to Buell Engineering Company, Inc., Lebanon, Pa., a corporation of Delaware
Filed Feb. 23, 1968, Ser. No. 707,684
Int. Cl. G01f 11/28
U.S. Cl. 222—442                    21 Claims

ABSTRACT OF THE DISCLOSURE

A diaphragm valve, according to the embodiment illustrated in the accompanying drawings, comprises a tubular body and one, two, three or more valve assemblies within the body, each valve assembly including a diaphragm member in the form of a sleeve of extensible material which is normally positioned in retracted position on a valve assembly body part and is sealed to the body part at spaced locations to define a pressure chamber. Fluid pressure is selectively applied to the chamber to extend and displace the diaphragm member outwardly into sealing engagement with the body and close off an annular material passage defined between the diaphragm and the body when the diaphragm is retracted. The valve further includes a vent passage arranged to be closed when the diaphragm is fully extended and engaged with the body and to be opened to vent pressure in a zone on one side of the diaphragm while the diaphram is less than fully extended but is still engaged with the body to prevent passage of materials.

BACKGROUND OF THE INVENTION

This invention relates to valves of the type used to control the passage of fluid materials, especially particulate solids, between zones at different pressures.

There are many instances in which particulate materials are conducted between zones which are at different pressures. For example, such materials are frequently handled by pneumatic conveying systems which are at pressures above or below atmospheric pressure, and the material is introduced into the conveying system from a hopper or other source which is at atmospheric pressure. Also materials in many processes are treated under controlled conditions which include pressures above or below atmosphere, and the material will be introduced from a hopper or other source into a processing vessel or system. In any case, where material is being transferred between zones at different pressures, it is usually necessary to provide some sort of valve or feeder between the zones, both to facilitate introducing the material and to restrict losses of pressure from a higher pressure zone to a lower pressure zone as much as possible.

One type of device commonly used for feeding particulate materials between zones at different pressures is a so-called rotary valve or rotary feeder. Rotary feeders characteristically comprise a housing carrying a rotor element having a number of material-receiving receptacles or so-called pockets and which rotates so that the pockets are successively conducted past an inlet where material is introduced into them. The pockets then move rotationally to an outlet for discharge of the material. The rotor is sealed around the inlet to a so-called shoe which maintains the differential pressure existing between the inlet and outlet. For many applications, a rotary feeder provides satisfactory service. However, with certain materials, especially highly abrasive materials, the inter-engaging surfaces of the shoe and rotor become worn very rapidly by intrusion of the materials between them so that the seal is destroyed after a relatively short time. Consequently, the feeder begins to leak excessively, and the conveying rate is reduced. These and other difficulties with rotary feeders and other similar types of valve or feeder equipment makes them unsatisfactory in some applications.

Another type of valve that has been proposed for these and other uses embodies one or more diaphragms of elastomeric material which are normally in retracted position to afford passage of materials but are distendable into sealing engagement with a coacting valve seat member or are pinched closed to stop passage of material. Although various forms of diaphragm valves have been suggested, they have not come into wide use, because most of those proposed heretofore have one or more serious disadvantages. For example, the pinch-type of diaphragm valve, by its very nature, is subject to relatively quick deterioration of the diaphragm element, inasmuch as it is bent and pinched into highly distorted and highly stressed condition on each operation. Another problem with these types of valves is that when they are opened, the higher pressure in the zone on one side of the valve creates a flow of gas through the valve passage into the lower pressure zone. Accordingly, where the material is being conducted through the valve from a lower pressure to a higher pressure zone, it must flow in counter-current to the back-flowing gas and is thus subject to high turbulence, loss of flow rate, and other detrimental effects.

SUMMARY OF THE INVENTION

There is provided, in accordance with the invention, a novel and improved diaphragm valve which overcomes many of the disadvantages of rotary feeders and previously suggested diaphragm valves and embodies various features providing improved operation, lower production and maintenance costs, reduced wear and other advantages. More particularly, a diaphragm valve, according to the invention, includes inner and outer bodies having substantially coextensive wall portions defining an annular passage between them, and a diaphragm member of elastomeric material carried by one of the bodies in sealed relation thereto at spaced locations to define a chamber. The diaphragm member is normally retracted in spaced relation to the wall of the other body to permit materials to pass through the annular passage but is selectively distended and displaced by application of fluid pressure in the chamber into sealing engagement with the wall of the other body to close off the passage and prevent the passage of materials and gases through the passage. An important feature of the valve of the invention is the provision of a vent passage which is arranged to be opened while the diaphragm remains in sealing engagement and obstructs the passage of materials and gases so that pressure across the valve is partly or fully equalized before the diaphragm is retracted into open position to afford the passage of the materials.

More particularly, in a preferred embodiment, the diaphragm is carried by the inner one of the bodies and is extendible outwardly into sealing engagement with the inner surface of a hollow, outer valve body. However, it is to be understood that the diaphragm may be carried by the outer body for displacement inwardly into sealing engagement with the inner body. In either case, the passage between the valve bodies is annular so that the diaphragm is not pinched but is relatively uniformly distended, thus avoiding sharply creasing or bending the diaphragm in the normal operation of the valve.

Various arrangement for venting a zone on one side of the valve are possible. For example, the vent may be formed in part by an annular space between a sleeve of flexible material placed opposite the diaphragm and backed up by a rigid valve body element. Thus, where the diaphragm is carried by the inner valve body, the elastomeric sleeve is positioned inside the outer body and is engaged by the diaphragm when the diaphragm is expanded. Openings through the sleeve communicate the passage with the zone or zones of the valve to be vented. When the diaphragm is fully extended so that it distends the elastomeric sleeve outwardly against the outer valve body, the space between the sleeve and the outer body constituting the vent passage is closed. On the other hand, when the diaphragm is less than fully distended so that the sleeve is separated from the body but the diaphragm remains in sealing engagement with the sleeve, venting through the passage is afforded while the valve remains closed to the passage of materials. Accordingly, the gases are vented and are conducted along a path separate from the path along which the materials flow through the valve. The vent may constitute a bypass between zones on opposite sides of individual valve diaphragm elements or may communicate with the atmosphere or any other desired location.

In the above-described and other forms of vent or bypass embodied in the valve, according to the invention, the diaphragm member itself closes the vent to stop communication of both materials and gases through the valve but allows the vent to open to vent a zone or to equalize presusre on opposite sides of the diaphragm before the diaphragm is fully opened to allow material to pass. This is an important feature of the invention because it ensures that the material will pass freely and uniformly through the valve when it is opened without being influenced by the simultaneous, concurrent passage of gases due to a differential pressure across the valve.

The vent passages may also take the form of conduits opening into the interior of the valve body in positions generally opposite from the diaphragm such that when the diaphragm is less than fully distended but is still sealed against the body wall to close the material passage, the conduit opening is uncovered. On the other hand, when the diaphragm is fully distended, the vent opening is covered and closed by the diaphragm. At any time that the valve is fully closed, therefore, the passage of both gases and materials across the valve is prevented. When the valve initially starts to open up, the vent opening is uncovered so that the pressure in the zone served by the vent is altered, and only upon further retraction of the diaphragm and after venting is the passage of materials through the valve afforded.

The valve according to the invention may include one, two, three or more diaphragm valve elements, depending on the uses and requirements for the valve. With one diaphragm, the valve serves as a shut-off valve equipped with a vent. With two diaphragms spaced from each other to provide a lock chamber between them, the valve provides a metering function and a lock action to afford conducting materials between zones at equal pressures or from a lower pressure zone to a higher pressure zone or from a higher presusre zone to a lower pressure zone. With three or more diaphragms, the valve has two or more metering and lock chambers, thus affording improved operation under higher pressure differentials.

As described in more detail below, the valve, according to the invention, may be of relatively simple construction with a relatively few different parts and therefore can be manufactured at a relatively low cost, even in small quantities. The inherent construction of the valve in which the materials passage is in the form of an annulus substantially prevents the possibility of the material bridging or otherwise blocking or jamming the valve. In the embodiment of the invention in which an elastomeric sleeve is included, and in which other parts of the interior structure which are exposed to the materials are formed of elastomers, the valve is well suited for handling highly abrasive materials, such as silica and Carborundum. The valve also has a long life, not only because of reduced wear with the use of elastomers, but because the elastomer parts are not subjected to sharp bends or crimping. The material is handled gently with a minimum amount of degregation, inasmuch as it is not subject to the turbulence of air flow through the valve passage, nor is there any shearing action exerted on it by elements of the valve. The capacity of the valve may be varied by varying the time duration of an operating cycle, and when capacities in excess of those provided by a single valve unit are desired, a multiplicity of valves may be used in parallel.

DESCRIPTION OF THE DRAWINGS

For a better understanding of the invention, reference may be made to the following description of exemplary embodiments, taken in conjunction with the figures of the accompanying drawings, in which:

FIGS. 5A to 5G depict, in sequence and alphabetically according to the letter suffix of the figures, the manner of operation of the valve embodiment of FIG. 1;

FIG. 6 is a diagram on a time scale of two operating cycles of the valve embodiment of FIG. 1;

FIG. 8 is a view in axial section of another embodiment which employs two valve assemblies and a modified form of bypass.

DESCRIPTION OF EXEMPLARY EMBODIMENTS

Figure 1:
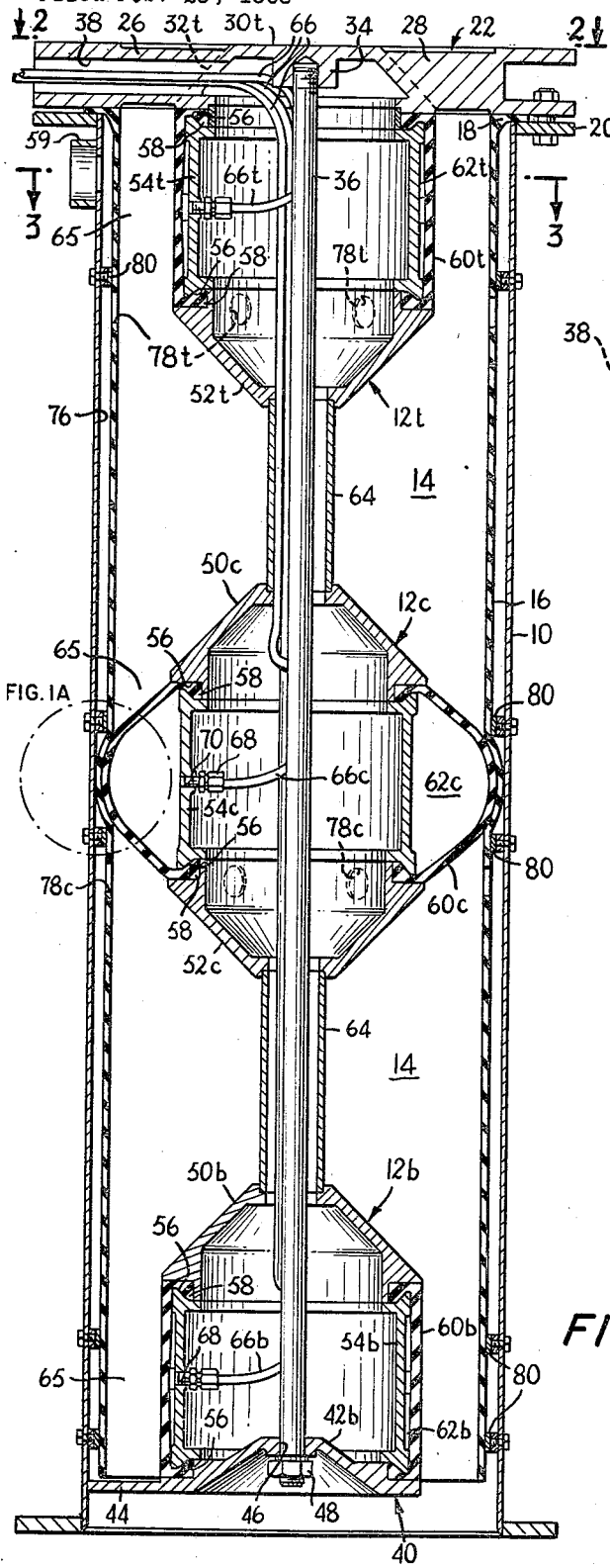
FIG. 1 is a view in section taken generally along the axis of one embodiment of the valve.
Figure 2:
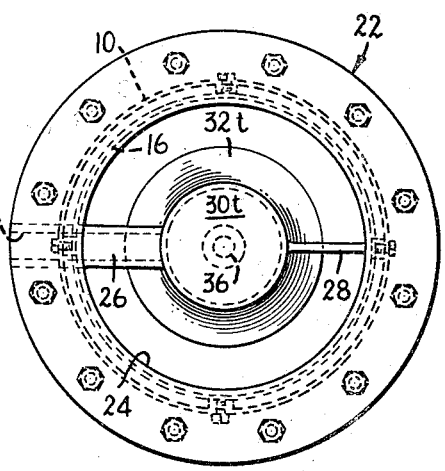
FIG. 2 is a top view of the embodiment of FIG. 1, as indicated by the lines 2—2 of FIG. 1.
Figure 3:
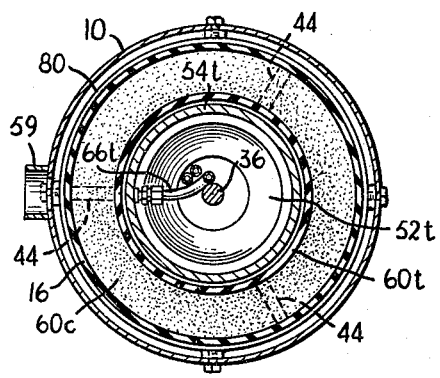
FIG. 3 is an end view in section of the embodiment of FIG. 1, the section being taken generally along a plane represented by the lines 3—3 of FIG. 1 and in the direction of the arrows.

Referring first to FIGS. 1 to 3, one form of valve embodying the invention is composed of an elongated hollow body member 10, which may be simply a length of metal pipe. Within the body are three valve diaphragm assemblies 12, the assemblies 12 being spaced-apart from each other longitudinally of the body member 10 to provide two lock chambers 14 between the adjacent pairs of assemblies. From the drawings, it is apparent that the three valve assemblies 12 are of generally similar construction, and therefore identical reference numerals are applied to corresponding parts of each. However, letter suffixes, $t$ for "top," $c$ for "center," and $b$ for "bottom," are applied to each assembly for the purpose of identifying a particular one when desired. In addition, certain variations in the parts of the assemblies are included in the embodiment shown in the drawings. It may be mentioned at this point, however, that the assemblies $12t$, $12c$ and $12b$ may be fully identical to each other, but in the interest of providing a valve unit of minimum length, the top and bottom assemblies $12t$ and $12b$ incorporate modified upper and lower parts, respectively.

Mounted within the body member 10 is a sleeve 16 of elastomeric material, such as natural or synthetic rubber or an appropriate plastic, which extends substantially the entire length of the body member 10. Rather than being one piece, a number of separate sleeves can also be used. The outer diameter of the sleeve 16 is slightly less than the inner diameter of the body member 10 so that the outer wall of the sleeve is spaced from the inner wall of the body. The upper end of the sleeve 16 has a flange 18 which is clamped between a flange 20 secured, as by welding, to the upper end of the body member 10 and a coupling flange member 22 bolted to the flange 20. The coupling member 22, as best shown in FIG. 2, is annular in plan and includes a central opening 24 having a diameter substantially equal to the internal diameter of the sleeve 16.

Extending generally diametrically across the coupling member 22 are ribs 26 and 28 which support an upper guide element 30t constituting the part of the top valve assembly 12t. As shown in FIG. 1, the guide element 30t includes an upwardly and inwardly tapering guide surface 32t (dotted lines in FIG. 1) and a downwardly projecting central boss 34 which is internally threaded and receives a rod 36 that extends substantially the entire length of the valve body member 10. The ribs 26 is, as shown in FIG. 2, of somewhat greater width than the rib 28 and is provided with a bore 38 through which conduits are led into the valve to supply pressure fluid, such as air, to the valve diaphragms, all as described in detail below.

At the lower end of the body 10 is a lower mounting member 40 which comprises a portion 42b serving as the lower member of the bottom valve assembly 12b and a series, for example three in number, of ribs 44 (see FIG. 3). The rod 36 passes through a center hole 46 in the member 40 and is threaded to receive a nut 48. The upper coupling member 22, the rod 36, and the lower mounting member 40 together constitute a mounting assembly for the three assemblies 12.

Each of the valve diaphragm assemblies 12t, 12c and 12b include, referring particularly to the center valve 12c, an upper guide and spacer part 50 in the form of a casting having an upwardly facing, frusto-conical guide surface (the surface 32t of the top assembly is the equivalent element of the top valve), a lower guide and spacer part 52 having a downwardly facing, frusto-conical surface (part 42t is the equivalent element of the bottom valve), and a body part 54 in the form of a sleeve positioned between and in end-to-end relation to the upper parts 50 and 52. As a matter of efficient manufacture, the parts 50 and 52 may be identical castings, and the parts 54 may likewise be identical.

The ends of the body parts 54 of the valve assemblies and the adjacent ends of the guide and spacer parts 50 and 52 are formed with flange formations which coact to define cavities 56 extending circumferentially around the valve assemblies and having an appropriate shape in cross-section to receive, clamp, and seal companion flange formations 58 extending about the upper and lower ends of a cylindrical diaphragm member 60 of the several assemblies. The diaphragm member 60 is formed of a suitable elastomeric material, such as rubber, synthetic rubber or an appropriate plastic. Normally, the diaphragm 60 is retracted into the configuration which is depicted by the top and bottom assemblies 12t and 12b as they are shown in FIG. 1. Preferably, the body part 54 of each assembly is formed with its major outer surface recessed below narrow bands of the surface near the top and bottom so that the inner surface of the diaphragm 60 is spaced from the outwardly facing surface of the body part 54. This facilitates rapid and even distribution of air or other gas pressure into the annular pressure chamber 62 defined between the diaphragm 60 and body part 54 of each valve diaphragm assembly.

The several elements making up each of the valve diaphragm assemblies 12 are assembled onto the mounting assembly constituted by the upper mounting member 22, the lower mounting member 40 and the rod 36 solely by means of clamping them together, the parts first being assemblied in proper relation on the rod, as depicted in FIG. 1, and then clamped together by installing and tightening the nut 48 on the lower end of the rod 36. The assemblies 12 are maintained in spaced relation to define the lock chambers 14 between them and the clamping forces are transmitted between the elements of the several valve assemblies by means of spacer tubes 64 positioned between the adjacent assemblies. This construction of the valve, in conjunction with the use of identical parts for the several valve elements, considerably facilitates fabrication of the parts and assembling them into the valve unit and correspondingly reduces the costs of making the units. In addition, the valve can readily be disassembled for maintenance, repair, and replacement of parts, as needed.

As mentioned above, the diaphragm member 60 of each of the assemblies is normally, that is, in the condition in which it is initially molded, substantially cylindrical in shape so that it elastically recovers to the configuration in which it is shown (in FIG. 1) on the top and bottom valve assemblies 12t and 12b. In this configuration, each of the valve assemblies defines with the co-extensive, inwardly facing portion of the sleeve 16 an annular passage 65 through which particulate material being handled by the valve can pass relatively freely. In this regard, the guide surfaces of the upper elements of the valve assemblies, coupled with the annular shape of the passage ensures the passage of materials through the annular passage 65 with a minimum opportunity for bridging or jamming.

As depicted by the center valve assembly 12c in its configuration shown in FIG. 1, the valve assemblies are operable to close off the annular passages 65 by distending or expanding the diaphragm 60 outwardly so that it engages and forms a seal with the sleeve 16. More particularly, each of the chambers 62 defined between the diaphragm 60 and the body parts 54 is coupled to a source of fluid pressure, such as air pressure, by a conduit 66t, 66c and 66b which is led in through the bore 38 in the upper mounting member 24 of the valve and is led down through the center of the valve within the hollow parts where it is coupled by coupling 68 to a fitting 70 on the respective body part 54.

Figure 4:
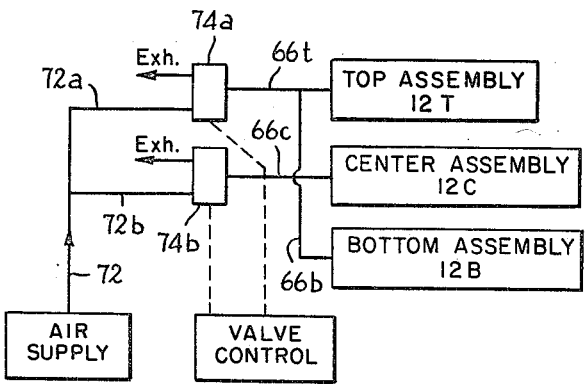
FIG. 4 is a schematic view of air supply and valve control apparatus utilizable for the forms of valves, according to the invention, which include three valve assemblies; as does the embodiment of FIG. 1.

Referring to FIG. 4, a source of air pressure, which is shown schematically by the box labeled "Air Supply," is connected by a supply conduit 72 and branch conduits 72a and 72b to three-way valves 74a and 74b. One of the branches of the valve 74b is connected by the conduit 66c to the pressure chamber of the center valve diaphragm assembly 12c, while the other outlet, as designated by the arrowed line, is an exhaust. One of the branches of the other valve 74a is connected by the conduits 66t and 66b, respectively, to the top and bottom assemblies 12t and 12b, while the other branch is an exhaust. The valves 74a and 74b may, for example, be three-way solenoid valves. The valves are controlled by a valve control (represented schematically in FIG. 4) which may, for example, be composed of cam-operated switches operating the solenoid valve. These and other types of valve controls are suitable, and because they are well known to those skilled in the art, they need not be described here or shown in detail in the drawings.

When the valves 74a or 74b are opened to the respective conduits leading to the valve diaphragm assemblies, air from the air supply is conducted into the pressure chamber defined between the diaphragm 60 and body part 54 of the associated assembly, thereby expanding the diaphragm 60 into sealing engagement with the sleeve 16, as described above. Moreover, the full expansion of the diaphragm 60 distends the sleeve 16 outwardly into sealing engagement with the inner surface of the valve body 10, as represented in the configuration of the center valve 12 in FIG. 1. Consequently, the passage of materials through the then closed passage 64b is precluded.

Figure 1A:
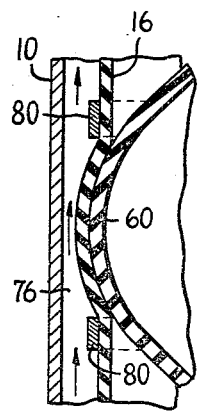
FIG. 1A is a fragmentary view in section of a portion of the valve embodiment of FIG. 1 showing an intermediate operating position, the portion being indicated by the circle capationed 1A in FIG. 1.

The annular space 76 (see FIG. 1) between the outer surface of sleeve 16 and the inner wall surface of the body 10 constitutes a bypass or vent passage serving the zones of the valve on either side of the diaphragms. In particular, if as shown in FIG. 1A a diaphragm 60 is not fully expanded but is expanded to an extent that it engages the sleeve 16 without distending or expanding the sleeve 16 into engagement when the wall 10, and also in any position other than fully expanded, passage of gases out from zones on either side of the diaphragm is afforded by spaced-apart, circumferential rows of holes 78 in the sleeve; one series of holes 78t is located just below the region of the sleeve 16 which is engaged by the diaphragm 60t of the top valve assembly 12t, and a second series of holes 78 is located just below the point where the sleeve 16 is engaged by the diaphragm 60c of the center valve assembly 12c. It will be noted that the lower end of the annular space 76 between the sleeve 16 and the body 10 is open to the zone below the lower valve assembly. The portion of the passage 76 above the top diaphragm is vented to the atmosphere through a port 59 (see FIG. 1), or it may be connected by a conduit back to the hopper, to an air cleaning system or any other suitable place.

As described below in conjunction with the operation of the valve, it is important that the bypass passage be opened up to vent a zone or to equalize the pressure differential across the valve element, as the case may be, before the diaphragm 60 disengages from the sleeve 16 and permits passage of material through the passage 64. In the embodiments of FIGS. 1 to 6, this is ensured by the provision of rings 80 backing up the sleeve 16 and providing a relatively short span across which the sleeve 16 is distended upon engagement by the diaphragm. Desirably, the sleeve 16 is secured to the several bands 80 so that the elnogation per unit length (i.e., strain) in the sleeve 16 as it is distended by the diaphragm is greater than the strain of the diaphragm. Consequently, the sleeve 16 holds firmly in engagement with the diaphragm and the desired results of the vent passage opening before the material passage is obtained.

The elastomers used for the diaphragm 60 and the sleeve 16 may be selected with a view to their endurance and sealing properties, respectively. The diaphragms are preferably of a relatively hard, high endurance elastomer, for example a rubber having a durometer value of 40 to 50, while the sleeve 16 is of a softer, more pliable elastomer, such as a rubber having a durometer value of 25 to 30. With this combination the diaphragm provides long life, and yet a good seal is obtained by virtue of the characteristics of the sleeve.

The operating sequence of the valve of the invention, as embodied in the form shown in FIGS. 1 to 4 of the drawings, is depicted generally schematically in FIGS. 5A to 5G and diagrammatically in FIG. 6. In FIGS. 5A to 5G, the operation of the valve is depicted in the environment of a gravity flow system, such as might be encountered in conducting material from an atmospheric pressure, as in a hopper (not shown) coupled to the member 22, into a conveying system (not shown) coupled to the lower end of the valve and operating at a pressure somewhat above atmospheric pressure. FIG. 6 shows by double lines on a time base and generally to scale the periods when each of the three diaphragms is expanded and sealed to close the material passage and vent passage. The captions at the top left of FIG. 6 relate the portions of the operating cycle indicated by them to the several FIGURES 5.

Referring first to FIG. 5A, the operating sequence may be considered to begin with a diaphragm C of the center valve assembly 12c expanded into engagement with the sleeve 16 to an extent engaging the sleeve 16 with the valve body 10, thus closing the material and vent passages associated with it. Meanwhile, the diaphragm T of top assembly and the diaphragm B of the bottom assembly are fully collapsed so that the material and vent passages associated with them are open. In this condition, material falls by gravity from the hopper above the valve down through the upper material passage and into the upper lock chamber U. Under the control of the valve control and air supply system (FIG. 4) the three valve assemblies dwell in the position shown in FIG. 5A for a time (see FIG. 6) sufficient to allow the upper lock chamber U to fill with material. Meanwhile, material previously contained in the lower lock chamber L drops down into the conveyor system.

After the upper lock chamber U has been filled and the lower lock chamber L emptied, the valve 74a (FIG. 4) is opened to admit air pressure to the top and bottom diaphragm pressure chambers to expand the diaphragms T and B outwardly to close the material passages and vent passages of the upper and lower valve assemblies. At this point the lower lock chamber L is at substantially the pressure of the outlet of the valve, specifically of the conveying system in the example being considered here, while the upper lock chamber U is at substantially the pressure of the inlet atmospheric pressure in this example. When all three valves are closed, as shown in FIG. 5B, pressure communication across each of the three valve assemblies is cut off. In addition, the closing of the top diaphragm T terminates the downward flow of material into the upper lock chamber U. The timing of the operation of the top valve assembly T may be such that the upper lock chamber U is fully filled when it closes, thus providing a measuring function for the valve, since the lock chamber is of known size. All three valves remain closed for only a relatively short time, which may be referred to as a lap period, as illustrated diagrammatically in FIG. 6.

After the relatively short lap period, the control valve 74b (FIG. 4) associated with the center valve assembly 12c is shifted to communicate the pressure chamber of the center diaphragm C with the exhaust, thereby permitting the center diaphragm to retract. Initially, the sleeve 16 retracts inwardly conjointly with the diaphragm 60 (see FIG. 1B), thereby opening up the vent passage associated with the center valve assembly while still keeping the center material passage closed. Accordingly, the differential pressure across the center valve is equalized by virtue of air passing out through the openings 78c (FIG. 1) and up through the annular passage 76 between the sleeve 16 and body 10 and in through the ports 78t to the upper lock chamber U, as represented by the arrowed lines in FIG. 5C. The point at which the valve is in the configuration depicted in FIG. 5C, may be considered to be substantially coincident with the point of retraction of the center diaphragm C, as designated by the caption 5C in FIG. 6.

After the pressure in the two lock chambers U and L is equalized and upon further retraction of the center diaphragm C to an extent separating the diaphragm C from the sleeve 16, as illustrated in FIG. 5D, the material in the upper lock chamber U passes downwardly from the upper lock chamber U into the lower lock chamber L, as represented by the arrowed lines in FIG. 5D. The downward passage of material past the center valve assembly takes place unobstructed by any counter-flow of air, inasmuch as the pressure across the center valve assembly was equalized prior to the opening of the center material passage, as just described. Moreover, the fact that the material flow passage is annular and the valve includes a frusto-conical guide surface ensures that the material will pass without danger of bridging or otherwise becoming blocked in the passage.

The center valve remains open for a sufficient period of time, as represented diagrammatically in FIG. 6, for all of the material in the upper lock chamber to flow down into a lower lock chamber L, the top and bottom diaphragms T and B meanwhile remaining closed and preventing leakage of air from the higher pressure conveying system below the valve upwardly through the valve into the hopper.

As soon as the lower lock chamber L has received all of the material from the upper lock chamber U, the center valve diaphragm C is closed, and as depicted in FIG. 5E, all three valve assemblies remain closed for a relatively short lap period (see FIG. 6). At this point, the lower lock chamber L is at a pressure approximately halfway between atmospheric (that of the hopper) and the pressure in the conveying system as a result of the equalization of pressure between the lock chambers when the center valve bypass and material passages were open (FIGS. 5C and 5D).

At the end of this lap period, the top and bottom valve assemblies are opened under the control of the air supply system of FIG. 4. In the manner that has been described previously, the initial portion of the retraction of the diaphragms T and B vents the pressure of the conveying system to the lower lock chamber by passage of air through the open lower end of the vent passage 56 and into the chamber U through the sleeve ports 78c and also vents the upper lock chamber U sleeve to the atmosphere by passage of air out through the sleeve ports 78t and through the vent outlet 79. This stage of operation is depicted in FIG. 5F. At this point, then, the lower lock chamber L is placed under a pressure substantially equal to the pressure in the conveying system, while the upper lock chamber U is placed under the pressure of the hopper. The center diaphragm C remains fully closed to maintain the pressure differential between the conveying system and the hopper.

As soon as the top and bottom diaphragms T and B are fully retracted, as shown in 5G, the measured quantity of material in the lower lock chamber L drops downwardly into the conveying system, the downward passage being unobstructed by any counter flow of higher pressure gas by virtue of the previous equalization of pressure between the conveying system and the lock chamber. Similarly, the opening of the top diaphragm T permits material to flow from the hopper into the upper lock chamber U.

It is apparent that the valve has now returned to the configuration illustrated in FIG. 5A (FIGS. 5A and 5G being identical), the starting point taken for the schematic illustration and foregoing description of an operating cycle. It should also be readily apparent that the above-described operating cycle is repeated continuously as long as the valve is feeding material from the hopper to the conveying system. The rate of feed can be appropriately controlled by the design of the air supply system (FIG. 4) and may be varied, such as by using a variable speed motor to drive a cam valve control or any other suitable means.

As mentioned above and as will be appreciated by those skilled in the art, the valve according to the invention may be equipped with only one valve assembly, in which case the valve is useful as a shut-off valve and offers the advantage of a vent for equalizing pressure on either side of it prior to opening for passage of materials. Similarly, the valve may embody only two valve assemblies. A two assembly valve will operate in a manner very similar to the three assembly form illustrated in FIGS. 1 to 6 and described above, but without the intermediate lock chamber. It will, nonetheless, provide the desirable metering and venting functions. Additional valve assemblies above two permit operation at higher total differential pressure across the valve unit as a whole, each valve assembly affording operation over an increment of the total differential.

Figure 7:
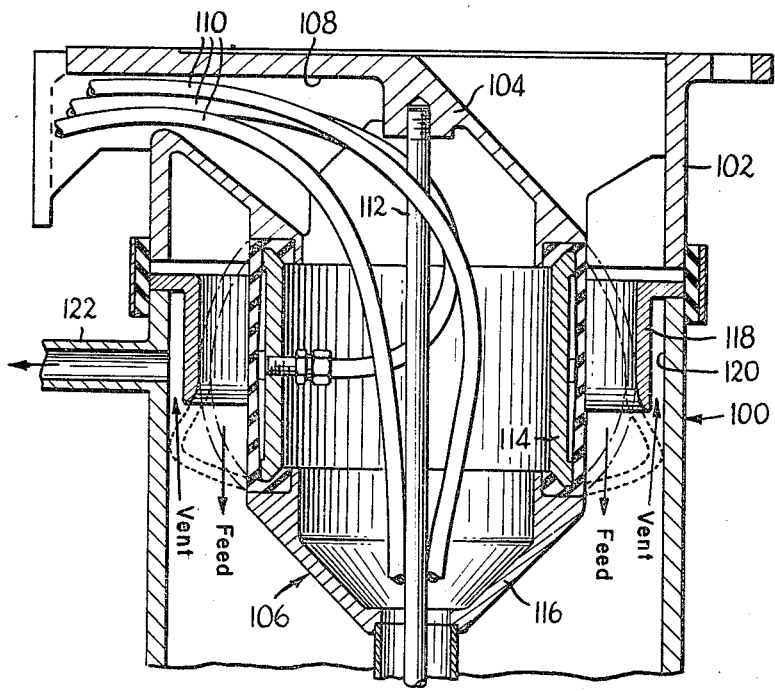
FIG. 7 is a side view in section of the upper part of another embodiment of a valve according to the invention, the section being taken generally along the axis of the valve.

Numerous variations and modifications of the structure of the valves, whether they be composed of one, two, three or more valve assemblies, can be made. For example, FIG. 7 depicts one modification of the valve of FIGS. 1 to 6, namely, the provision of an alternate form of vent system. In general, the valve shown in FIG. 7 (only one valve assembly, the upper one, being shown in FIG. 7) comprises a hollow body 100 in the form of a section of pipe, an upper mounting member 102 carrying the upper guide 104 of a valve assembly 106 and having a passage 108 for leading in air pressure supply conduits 110, a center tie rod 112, a valve assembly body part 114 and a lower guide part 116, all of these parts being fundamentally the same as those employed in the embodiment of FIGS. 1 to 6. The valve of FIG. 7 does not, however, include the elastomer sleeve 16 which forms on the wall of a bypass passage. Instead, it has a ring element 118 installed in the body 100 at a position generally opposite the valve diaphragm 120. The ring 118 is generally L-shaped in cross section and is appropriately joined, such as by welding, to the upper end of the body 100, or to the inner wall surface of the body, if desired. The annular space 120 between the cylindrical part of the ring 118 and the inner wall of the body 100 constitutes a vent passage, behind which are one or more vent ports 122. FIG. 7 shows the upper valve assembly, but it will be appreciated that any additional valve assemblies incorporated in the valve may be constructed in a substantially identical manner. The upper valve vent port 122 may communicate with the atmosphere, a dust removal system or may return to a hopper or the like, associated with the system, while the vent ports associated with the other valve elements are communicated by conduits across the valve element with which they are associated in a manner identical in principle to that embodied in the form of valve shown in FIGS. 1 to 6.

In operation, the valve of FIG. 7 provides a fully closed position against both venting and passage of material when the diaphragm 120 is fully distended, as represented by the dotted line showing in FIG. 7, such that a portion of the diaphragm engages the inwardly facing wall of the vent sleeve ring 118 while another portion of the diaphragm is expanded out into sealing engagement with the body 100 below the lower end of the ring and thus forms a seal between the vent ring 118 and the body 100 against passage of air into the vent. When the diaphragm 114 partially retracts from its fully expanded condition, as represented by the phantom line showing in FIG. 7, the vent passage is opened so that air is vented out through the port 122 by passing in the lower open end of the vent ring. In the meantime, the diaphragm remains sealed against the inner wall of the ring 118 to prevent the passage or feed of material down past the valve assembly.

A slightly modified form of the embodiment of FIG. 7 may employ a ring or sleeve of generally the same form as the ring 118 except one made of elastomeric material and having a somewhat greater length so that it extends below the lower end of the diaphragm. In this form, the vent is open and closed by distension and relaxation of the sleeve in much the same manner as in the embodiment of FIGS. 1 to 6. Basically, this modification involves using separate elastomeric vent sleeves rather than a single continuous sleeve in the valve of FIGS. 1 to 6, a point mentioned above.

FIG. 8 shows another modified form of venting in conjunction with a valve which is otherwise of substantially the same construction as the forms of valves in FIGS. 1 to 6 and 7. The valve of FIG. 8 also is illustrative of a two valve assembly form of the invention. Consequently, the elements of the valve, other than those associated with the vent passage need not be described here.

Like the valve of FIG. 7, the valve shown in FIG. 8 does not include a sleeve 16, and the diaphragm 130 of each of the two valves assemblies 131t and 131b directly engages a tubular outer valve body 132. The vent passage in the embodiment of FIG 8 is constituted by one or more vent openings or ports 134t and 134b adjacent each diaphragm and constituted by holes drilled through the wall of the body 132 receiving the inlet end of a vent conduit 136t and 136b, respectively. The outlet end of the conduit 136b opens into the top part of the lock chamber 138 and serves as a bypass across the bottom valve assembly 131b, while the conduit 136t constituting the vent from the lock chamber leads to the atmosphere or some other outlet as may be appropriate in the system. Each of the vent inlet ports 134t and 134b is located slightly below the longitudinal center plane of the corresponding diaphragm 130. Accordingly, when the diaphragm 130 is less than fully expanded into the sealing engagement with the body and is in the configuration of the bottom diaphragm 130b as shown in solid lines in FIG. 8, the center part engages the valve body 132 and closes the feed passage through the valve but leaves the inner end of the vent port 134b, which is flush with the inner wall of the body 132, uncovered and allows air in the zone below the diaphragm to vent through the conduit. Nonetheless, the valve assembly remains closed to the passage of material. When the diaphragm 130 is fully extended, as illustrated by the top diaphragm 130t as shown in solid lines in FIG. 8, a greater area of the diaphragm engages the inner wall of the body 132 and, in particular, engagement of the diaphragm is to an extent such that the inner end of the vent opening 134t is covered and thus sealed against venting.

The two valves diaphragm assembly form of valve operates in much the same manner as the three valve form of FIGS. 1 to 6, except that only one lock stage takes place. When the upper valve is opened and the lower valve closed, material enters the lock chamber. The upper valve is then closed, and after a short lap period, the lower valve is opened, and in the course of opening first vents the valve outlet to the lock chamber to equalize pressure and then allows the measured body of material to pass out. Next, the lower valve is closed, and after a lap period, the upper valve is opened first to vent the lock chamber and then to allow material to enter the lock chamber. This operating cycle is repeated at a frequency required to yield a desired feed rate. Again, venting occurs at each phase so that material flows through the valve without interference by concurrent gas flow between zones at different pressures.

The above-described embodiments of the invention are intended to be merely exemplary, and those skilled in the art will be able to make numerous variations and modifications, in addition to those mentioned above, without departing from the spirit and scope of the invention.

I claim:
1. A valve comprising first and second bodies having substantially coextensive spaced-apart wall portions facing each other and defining an annular passage between spaced-apart zones, an annular diaphragm member of extensible material carried by one of the bodies in a position generally coextensive with the wall portion thereof and in sealed relation thereto at spaced locations to define a chamber between it and the body by which it is carried, the diaphragm member normally being retracted in spaced relation to the wall portion of the other body to afford passage of materials between the zones through the annular passage, means for selectively creating fluid pressure in the chamber to extend and displace the diaphragm into engagement with the other body to obstruct the passage of materials through the annular passage, and means on one of the bodies defining a vent passage for one of the zones, the vent passage means being arranged in relation to the diaphragm member to be opened and closed selectively by the diaphragm member.

2. A valve according to claim 1 wherein the diaphragm is carried by the inner one of the bodies and is extendable outwardly into sealing engagement with the wall portion of one of the bodies.

3. A valve according to claim 1 wherein the wall portions of the bodies in at least the parts thereof coextensive with the diaphragm are substantially cylindrical.

4. A valve according to claim 1 wherein the said other of the bodies includes a sleeve of elastomeric material and a back-up member of substantially rigid material disposed adjacent the surface of the sleeve remote from the said one body and backing up the sleeve upon its deformation when it is engaged by the diaphragm.

5. A valve according to claim 4 wherein the elastomeric sleeve and back-up member are spaced-apart, the space between the sleeve and back-up member constituting the vent passage and the sleeve including an opening on at least one side of the portion thereof engaged by the diaphragm.

6. A valve according to claim 1 wherein the vent passage includes an opening formed in the said other body in a position thereon to be engaged and closed by the diaphragm when the diaphragm is substantially fully distended and to be disengaged and opened when the diaphragm is partially distended and is still in sealing engagement with the said other body thereby to open the vent passage while precluding passage of materials through the annular passage.

7. A valve according to claim 6 wherein the vent passage includes an annular flange formation extending into the annular passage from the said other body, the flange having an edge spaced from the wall of the said other body to define the said opening.

8. A valve according to claim 6 wherein the said opening includes a port formed through the said other body, the edges defining the port being flush with the wall portion.

9. A valve comprising a tubular body including at least one substantially cylindrical wall portion; a valve assembly disposed within and coaxially of the body and including a member having a cylindrical wall portion spaced from and generally coextensive with the wall portion of the body and defining therewith an annular passage between first and second zones above and below the valve assembly, a diaphragm member of extensible material carried by the member in sealed relation thereto at spaced locations to define a chamber between the diaphragm member and the member, the diaphragm member normally being retracted in spaced relation to the wall portion of the body to afford passage of materials between the zones through the annular passage, and means for selectively creating fluid pressure in the chamber to extend and displace the diaphragm into engagement with the body wall portion to obstruct the passage of materials through the annular passage; and means defining in the tubular body a vent passage for one of the zones, the vent passage being arranged in relation to the diaphragm member to be selectively closed by the diaphragm member when it is fully extended into the sealing engagement with the body and to be opened when the diaphragm member is less than fully extended but is still in sealing engagement with the body thereby to vent the zone without affording passage of materials through the annular passage.

10. A valve according to claim 9 wherein the tubular body includes two substantially cylindrical wall portions spaced apart from each other, and wherein there are two valve assemblies including a first valve assembly generally coextensive with the first wall portion and a second valve assembly generally coextensive with the second wall portion, the two valve assemblies thus being spaced apart and defining in a space between them a lock chamber for material to be conducted through the valve.

11. A valve according to claim 10 wherein the vent means serves the lock chamber, and further comprising means defining in the body a second vent passage by-passing the second valve assembly to communicate a third zone on the side of the second valve from the lock chamber with the lock chamber, the second vent passage being arranged in relation to the diaphragm member of the second valve assembly to be closed when the diaphragm member is in fully extended sealing engagment with the second wall portion and to be opened when the diaphragm is less than fully extended but is still in sealing engagement with the second wall portion thereby to equalize pressures in the third zone and the lock chamber.

12. A valve according to claim 9 wherein there are three spaced-apart cylindrical wall portions in the tubular body and wherein there are three valve assemblies, including two outer valve assemblies and a center valve assembly between the outer valve assemblies, one valve assembly being disposed within each of the wall portions and coextensive therewith, and the respective valve assemblies being spaced-apart to define first and second lock chambers for material to be conducted through the valves.

13. A valve according to claim 12 wherein there is a vent passage associated with each of the three valve assemblies.

14. A valve according to claim 12 further comprising means associated with the means for selectively creating fluid pressure in the chambers of the respective valve assemblies for operating the valve assemblies in the following sequence:
 (a) maintaining the diaphragm members of the outer two valve assemblies in retracted position while maintaining the second valve member expanded in sealing engagement with the body;
 (b) expanding the diaphragm members of the outer two valve assemblies in sealing engagement with the body while maintaining the center valve assembly diaphragm expanded in sealing engagement with the body;
 (c) retracting the diaphragm member of the center valve assembly while maintaining the diaphragm members of the outer valve assemblies expanded in sealing engagement with the body;
 (d) expanding the diaphragm member of the center valve assembly into sealing engagement with the body while maintaining the diaphragm members of the outer two valve assemblies expanded in sealing engagement with the body; and
 (e) retracting the diaphragm members of the two outer valve assemblies while maintaining the diaphragm member of the center valve assembly in sealing engagement with the body.

15. A valve according to claim 9 further comprising a sleeve of elastomeric material within the tubular body, the sleeve being spaced inwardly of the inner surface of the body and the space between the body and sleeve constituting a portion of the vent passage and having an opening therein to communicate the passage with a zone on one side of the diaphragm member.

16. A valve according to claim 9 wherein the vent passage includes an opening in the body in a position to be engaged and closed by the diaphragm member when the diaphragm member is substantially fully distended and to be disengaged and opened when the diaphragm is less than fully distended but is still in sealing engagement with the body, thereby venting a zone of the valve while precluding passage of materials through the annular passage between the valve assembly and body.

17. A valve according to claim 16 wherein the vent passage includes an annular flange formation extending inwardly into the annular passage from the wall portion of the body, the flange having an edge spaced from the wall portion to define the opening.

18. A valve according to claim 16 wherein the opening includes a hole formed through the body, the edges of the hole at the inner wall surface of the body being flush with the wall portion.

19. A valve comprising a hollow body member having a substantially cylindrical inner wall, spaced-apart support members disposed transversely to the body and extending across the interior of the body and secured to the body, at least one valve assembly disposed within the body and between the spaced transverse members, each valve assembly including a body part having a substantially cylindrical outer surface disposed concentrically with and spaced inwardly from the cylindrical inner wall of the body to define an annular passage therewith, a diaphragm member of extensible material carried by the valve assembly body part and in sealed relation thereto at spaced locations to define therewith a chamber, the diaphragm member normally being retracted in spaced relation to the inner wall of the body member to afford passage of materials through the annular passage, means for selectively creating fluid pressure in the chamber to extend and displace the diaphragm into engagement with the body passage inner wall to close the annular passage and prevent flow of materials through it, an elongated valve assembly carrier member extending axially of the body between the spaced transverse support members and affixed to one of the transverse support members, spacer elements disposed between the valve assembly and the transverse support members to position the valve assembly in spaced relation to the support members, and coupling means associated with the longitudinal element for clamping the valve assembly and spacer elements into assembled relation with the body.

20. A valve according to claim 19 wherein the valve assembly further includes upper and lower guide elements in end-to-end relation with the ends of the valve assembly mounting member, clamp formations defined between the ends of the guide elements in the respective adjacent ends of the valve assembly body mounting member, the portions of the diaphragm member being received in the clamp formations and being held therein in clamped relation by the coupling means.

21. A valve according to claim 20 wherein the body part, diaphragm and guide elements of each valve assembly are held in assembled relation solely by means of the clamping action afforded by the coupling means.

References Cited

UNITED STATES PATENTS

| | | | |
|---|---|---|---|
| 2,889,892 | 6/1959 | Schaub et al. | 222—442 X |
| 3,303,974 | 2/1967 | Bleuler | 222—442 X |

STANLEY H. TOLLBERG, Primary Examiner

U.S. Cl. X.R.

222—450